United States Patent [19]
Rode et al.

[11] 3,946,218
[45] Mar. 23, 1976

[54] GENERAL PURPOSE CALCULATOR WITH CAPABILITY FOR PERFORMING YIELD-TO-MATURITY OF A BOND CALCULATION

[75] Inventors: France Rode, Los Altos; William L. Crowley, Jr., Cupertino; Alexander D. R. Walker, Mount View; David S. Cochran, Palo Alto, all of Calif.

[73] Assignee: Hewlett-Packard Company, Palo Alto, Calif.

[22] Filed: Oct. 10, 1974

[21] Appl. No.: 513,903

Related U.S. Application Data
[62] Division of Ser. No. 302,371, Oct. 30, 1972, Pat. No. 3,863,060.

[52] U.S. Cl. ............................................. 235/156
[51] Int. Cl.² .......................................... G06F 15/30
[58] Field of Search ............ 235/156, 159, 160, 164, 235/92 AC, 92 CP; 444/1; 340/172.5

[56] References Cited
UNITED STATES PATENTS

| | | | |
|---|---|---|---|
| 3,533,078 | 10/1970 | Perkins et al. | 340/172.5 |
| 3,631,403 | 12/1971 | Asbo et al. | 340/172.5 |
| 3,720,820 | 3/1973 | Cochran | 235/156 |
| 3,760,171 | 9/1973 | Wang et al. | 235/156 |

*Primary Examiner*—David H. Malzahn
*Attorney, Agent, or Firm*—F. David LaRiviere

[57] ABSTRACT

A battery-powered, hand-held, calculator employs MOS/LSI calculator circuits to perform arithmetic and financial calculations. Data and commands are input to the calculator from a keyboard having shift key to double the functions of selected keys. A 15-digit, seven-segment light emitting diode (LED) display serves as the output for the calculator. The calculator circuits include a read-only memory circuit in which the algorithms for performing the arithmetic and financial calculations are stored; a control and timing circuit for scanning the keyboard, retaining status information about the condition of the calculator or of an algorithm, and generating the next read-only memory address; and an arithmetic and register circuit containing an adder, a group of working registers, a group of data storage registers forming a stack for roll down operation, and a constant storage register. These circuits are interconnected by a multiple line buss system.

6 Claims, 3 Drawing Figures

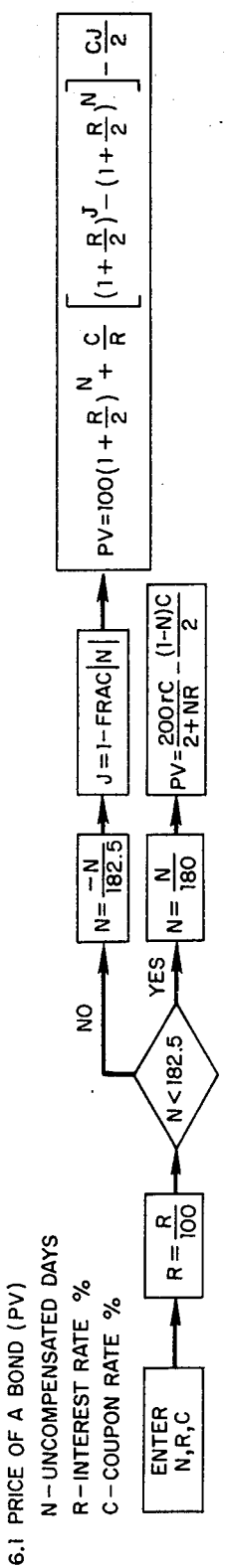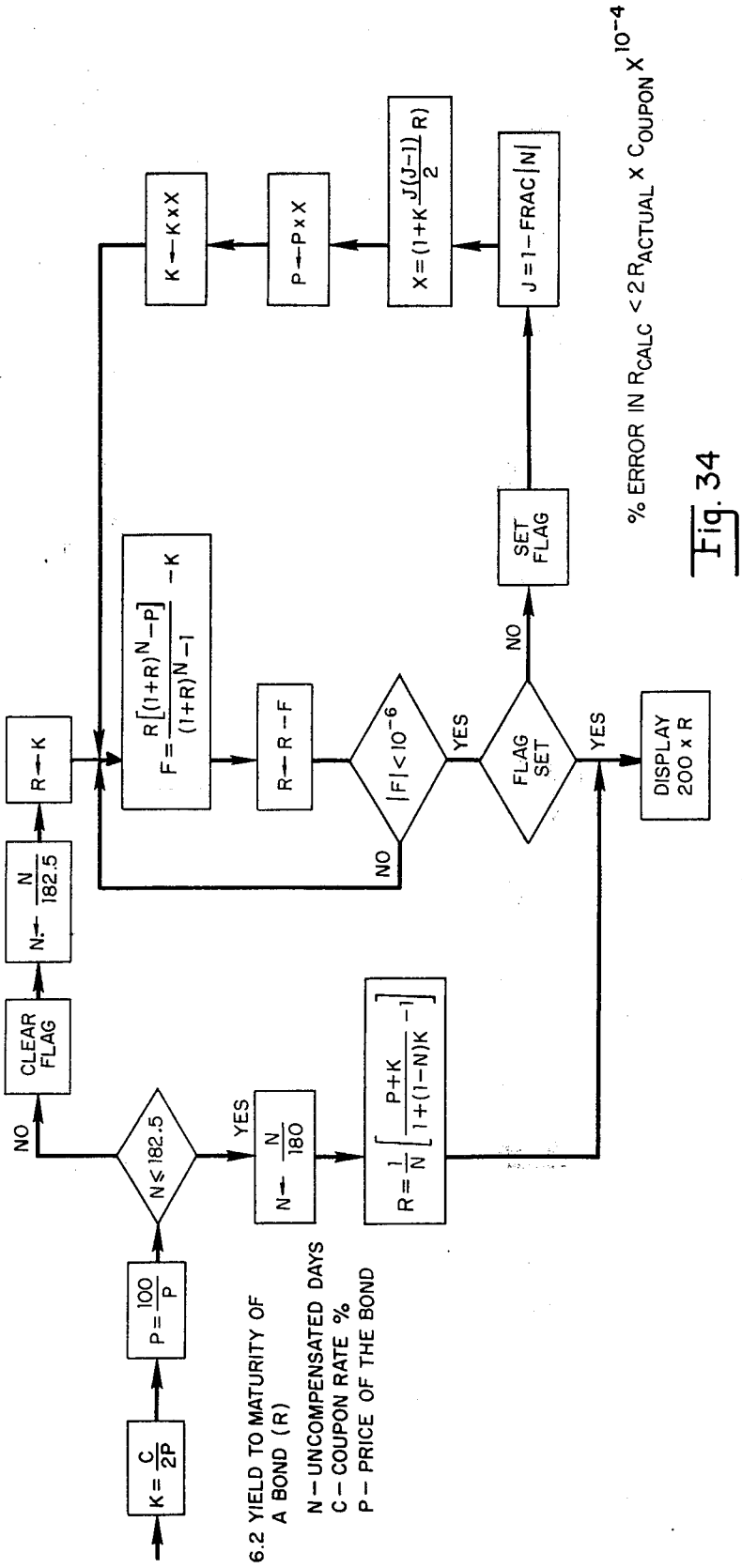
Fig. 33
Fig. 34

GENERAL PURPOSE CALCULATOR WITH CAPABILITY FOR PERFORMING YIELD-TO-MATURITY OF A BOND CALCULATION

CROSS-REFERENCE TO RELATED APPLICATION

This application is a division of allowed U.S. Pat. application Ser. No. 302,371 entitled "General Purpose Calculator with Capability for Performing Interdisciplinary Business Calculations" filed by France Rode, et al. on Oct. 30, 1972, and now U.S. Pat. No. 3,863,060 and which is hereby incorporated by reference as amended as if fully set forth herein.

BACKGROUND AND SUMMARY OF THE INVENTION

This invention relates generally to calculators and improvements therein and more particularly to non-programmable business calculators.

Owing to the high cost and the limited capabilities of the available business calculators, and sometimes, simply because there is no calculator available to perform certain calculations, the majority of the everyday business calculations are still made with the aid of published tables. Published tables are the only convenient means available for solving certain financial problems. The main disadvantage of using tables is the inherent restriction to the discrete values given in the table. The accuracy of the calculation is limited to the accuracy of the tables and the need for interpolation further compromises the calculation. For example, a widely used bond value table has discrete values for bond yield to two decimal places and the interest rate is given in one-eighth of one percent increments. The use of tables with this limited accuracy could lead to errors of several thousands of dollars in a fifty million dollar bond issue.

Conventional business calculators for bond price and bond yield calculations have a manual switch to initiate different bond price and bond yield algorithms for bonds maturing in less than 181 days (these are considered as notes rather than bonds). The present calculator has an automatic feature to check the maturity period and initiate the proper algorithm. The algorithms traditionally used in conventional business calculators to solve bond price and bond yield are very complex and require extensive hardware capability. This has made these calculators large, complicated, and expensive. In the present calculator, therefore, the complex bond price and bond yield problems (and the solutions thereof) was simplified to make either problem solvable using only five registers. This simplification provides an explicit term that eliminates the complexity of a series of summations, which would otherwise require substantially more hardware. Thus, two new algorithms requiring significantly less hardware for bond price and bond yield calculations are provided in a small, general purpose calculator at a fraction of a special bond calculator price.

The algorithms are stored in a read-only memory circuit including seven serial-address in, serial-instruction out read-only memories regulated by a control and timing circuit. This control and timing circuit includes a microprogrammed controller, which receives status conditions from throughout the calculator and sequentially outputs signals to control the flow of data. The control and timing circuit also scans the keyboard to obtain a six-bit read-only memory address, which is generated at the keyboard each time a key is actuated as required to initiate one or more algorithms for performing the functions associated with the actuated key.

Information from the addressed read-only memory is transmitted serially to an arithmetic and register circuit where a serial, binary-coded decimal (BCD) adder/subtractor performs the basic computations. The results of the computations are transmitted to registers in this circuit where they are either stored temporarily or outputted via a seven-segment, 15-digit, LED display.

DESCRIPTION OF THE DRAWINGS

FIG. 33 is a flow diagram of a price of a bond algorithm employed in the calculator of FIG. 1.

FIG. 34 is a flow diagram of the yield to maturity of a bond algorithm in the calculator of FIG. 1.

FIGS. 2–32 inclusive and FIGS. 35A and B may be found in the above incorporated U.S. Patent.

DESCRIPTION OF THE PREFERRED EMBODIMENT

Figure 1:
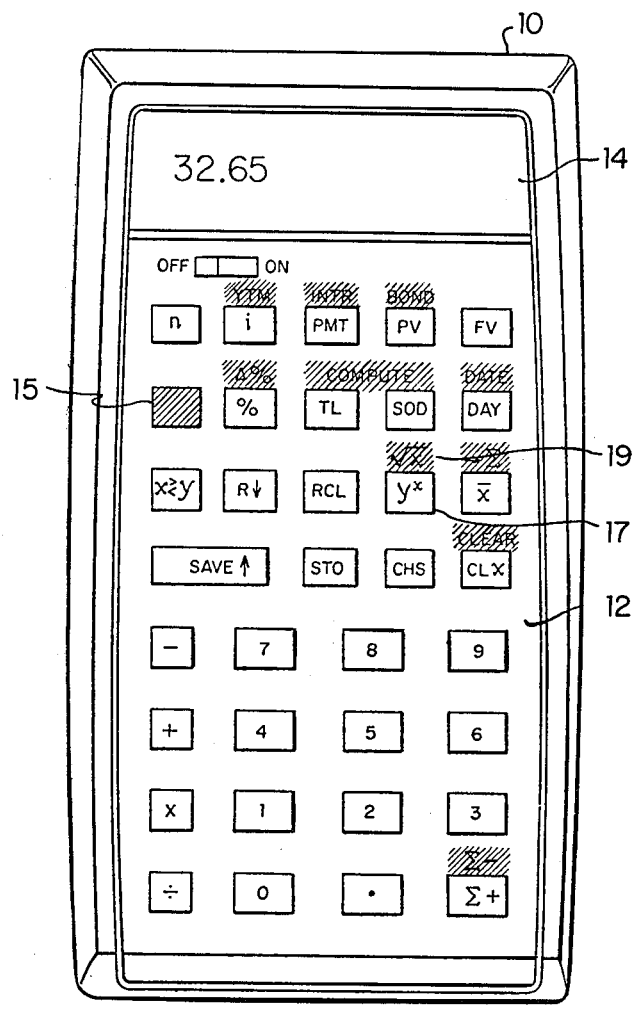
FIG. 1 is a top-view of a calculator according to the preferred embodiment of the invention.

Refer to U.S. Pat. No. 3,863,060.

We claim:

1. An electronic calculator for calculating the yield to maturity of a bond having a maturity period, a bond price and a coupon rate, said calculator comprising:
    a first register for initially storing a first number representing the coupon rate divided by the bond price multiplied by a first selected value;
    a second register for initially storing a second number representing the inverse of the bond price multiplied by a second selected value;
    a third register for storing a third number having a magnitude greater than one and representing the normalized value of days in the maturity period;
    a fourth register for initially storing the contents of the first register;
    a fifth register for storing the results of calculations;
    a first means coupled to the first, second, third, and fourth registers for combining the contents thereof in accordance with the relation $$F = R \ \frac{[\ (1+R)^N - P]}{(1+R)^N - 1} - K,$$

where R is the contents of the fourth register, N is the contents of the third register, P is the contents of the second register, and K is the contents of the first register, said first means being coupled to the fifth register for storing the result of this combination therein;
    flag means, coupled to the third register, having set and reset states for indicating when the interest portion of the bond yield has been calculated;
    said flag means being set when the accrued interest portion of the bond yield has been calculated;
    said flag means being reset in response to the contents of the third register when those contents are greater than a third selected value;
    second means coupled to the fourth and fifth registers for subtracting the contents of the fifth register from the contents of the fourth register and for storing the difference in the fourth register, said last-stored contents of the fourth register representing the calculated yield to maturity of the bond;

accruing means coupled to the first means and the first, second, third, and fourth registers for calculating an accrued interest portion of the bond price, for adjusting the contents of the first and second registers to account for the accrued interest portion of the bond price, and for thereafter causing the first means to combine the contents of the third register and the last-stored contents of the first, second, and fourth registers in accordance with said relation and store the result of this combination in the fifth register;

third means, coupled to the flag means and responsive to the contents of the fifth register, for initiating operation of the accruing means when those contents are less than a fourth selected value and when the flag means is in the reset state; and output means coupled to the fourth and fifth registers and to the flag means for providing a visual output indication of the contents of the fourth register in response to the contents of the fifth register when the contents of the last-mentioned register are less than the fourth selected value and when the flag means is in the set state.

2. An electronic calculator as in claim 1 wherein the third means is also coupled to the first means, and responsive to the last stored contents of the fifth register when those contents equal or exceed the fourth selected value, for causing the first means to recombine the contents of the first, second, and third registers and the last-stored contents of the fourth register in accordance with said relation and store the result of this combination in the fifth register.

3. An electronic calculator as in claim 1 wherein the accruing means comprises:

fourth means coupled to the third means and the third register for operating on the contents of the third register in accordance with the relation $J = 1-\text{FRAC }|N|$ and for storing the result of this operation in another register;

fifth means coupled to the first and fourth registers and said other register and operable, after operation of the fourth means, for combining the contents of the first register and the last-stored contents of the fourth register with the last-stored contents of said other register in accordance with the relation $$X = \left(1 + K \ \frac{J(J-1)}{2} R\right),$$

where J is the last-stored contents of said other register, and for storing the result of this combination in said other register; and sixth means coupled to the first means, the first and second registers, and said other register and operable, after operation of the fifth means, for multiplying the contents of the first and second registers by the result last stored in said other register and for thereafter causing the first means to combine the contents of the third register and the last-stored contents of the first, second, and fourth registers in accordance with said relation and store the result of this combination in the fifth register.

4. An electronic calculator as in claim 3 wherein said other register comprises the fifth register.

5. An electronic calculator as in claim 4 wherein the third means is also coupled to the first means, and responsive to the last-stored contents of the fifth register when those contents equal or exceed the fourth selected value, for causing the first means to recombine the contents of the first, second, and third registers and the last-stored contents of the fourth register in accordance with said relation and store the result of this combination in the fifth register.

6. A calculator as in claim 1 for calculating the yield to maturity of a bond when the contents of the third register is equal to or less than a one wherein the first means combines the contents of the first, second and third registers in accordance with the relation $$R = \frac{1}{N} \left[\frac{P+K}{1+(1-N)K} - 1\right].$$

* * * * *